United States Patent Office 3,534,068
Patented Oct. 13, 1970

3,534,068
DYES OF THE 1-AMINO-4-ALKYLAMINOANTHRA-QUINONE-2-CARBOXYLIC AMIDE SERIES
Karl Maier, Ludwigshafen (Rhine), Germany, assignor to Badische Anilin- & Soda-Fabrik Aktiengesellschaft Ludwigshafen (Rhine), Germany
No Drawing. Filed June 1, 1967, Ser. No. 642,680
Claims priority, application Germany, June 10, 1966, 1,644,446
Int. Cl. C09b 1/28
U.S. Cl. 260—377                             4 Claims

ABSTRACT OF THE DISCLOSURE

1 - amino - 4 - alkylaminoanthraquinone-2-carboxylic amides which bear alkyl groups as substituents on the amide nitrogen atoms are blue dyes which can be prepared for example from 1-amino-4-nitroanthraquinone-2-carboxyl chloride by reaction with amines followed by reaction with alkylamines.

---

This invention relates to new dyes of the 1-amino-4-alkylaminoanthraquinone-2-carboxylic amide series.

It is known that derivatives of 1-aminoanthraquinone-2-carboxylic amide which contain in the 4-position of the anthraquinone nucleus an amino group bearing alkyl or cycloalkyl radicals as substituents dye cellulose acetate bright blue shades. The dyeings have however poor wet-fastness properties, in particular poor fastness to water and perspiration. Moreover the yield of these dyes is unsatisfactory.

We have now found anthraquinone dyes which have considerably better wet-fastness properties and yield than the above-mentioned prior art dyes. The new valuable dyes have the general formula:

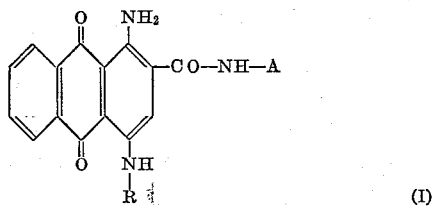

in which R denotes an alkyl radical having one to three carbon atoms, preferably the methyl group, and A denotes a linear or branched alkyl radical having one to six, preferably three to five, carbon atoms. The radical A may denote for example a methyl radical, ethyl radical, propyl radical, isopropyl radical, butyl radical, isobutyl radical or amyl radical.

Dyes having the general formula:

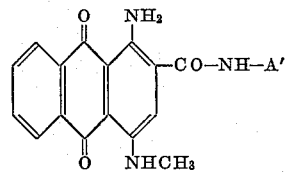

in which A' denotes a linear or branched alkyl radical having three to five carbon atoms are of particular technical interest.

The new dyes may be advantageously prepared by reacting 1-aminoanthraquinone-2-carboxylic halides or 1-aminoanthraquinone-2-carboxylic esters which contain in the 4-position a nitro group or a halogen atom with alkylamines having the formula A—NH$_2$ (in which A denotes a linear or branched alkyl radical having one to six, preferably three to five, carbon atoms) to form the corresponding amides, the substituents in the 4-position of the anthraquinone nucleus then being exchanged by a conventional method for the radical having the formula —NH—R, in which R denotes an alkyl radical having one to three carbon atoms, preferably the methyl radical.

Examples of 1 - aminoanthraquinone - 2 - carboxylic halides of the said type are 1-amino-4-nitroanthraquinone-2-carboxylic acid chloride, 1-amino-4-nitroanthraquinone-2 - carboxylic acid bromide, 1 - amino - 4 - bromo-anthraquinone-2-carboxylic acid chloride and 1-amino-4-chloroanthraquinone-2-carboxylic acid chloride. Examples of 1-aminoanthraquinone-2-carboxylic esters of the said type are 1-amino-4-nitroanthraquinone-2-carboxylic alkyl esters having low molecular weight alkyl groups, preferably the methyl esters. Among these starting materials, 1-aminoanthraquinone-2-carboxylic acid chlorides are preferred.

Examples of suitable alkylamines having the formula A—NH$_2$ are: methylamine, ethylamine, propylamine, isopropylamine, butylamine, isobutylamine, 2-aminobutane and amylamines.

The aminoanthraquinone carboxylic acid halides or the corresponding esters are reacted with the said alkylamines for example in a solvent, such as benzene, toluene, xylene, chlorobenzene or methanol at a temperature of up to 100° C., preferably between 20° and 60° C., to form the corresponding aminoanthraquinone carboxylic amides. For example double the molar amount of alkylamine may be used with reference to acid chloride, or a molar amount of alkylamine and in addition acid-binding agents may be used in the reaction mixture. Examples of acid-binding agents are compounds having a basic reaction, as for example the carbonates or bicarbonates of the alkali metals.

The nitro group or the halogen atom in the 4-position of the anthraquinone nucleus in the acid amides thus obtained is replaced by the radical R—NH— (in which R denotes an alkyl radical having one to three carbon atoms, preferably the methyl radical) by reaction with amines having the formula R—NH$_2$.

The nitro group in the 4-position of the 1-aminoanthraquinone-2-carboxylic acid amides is replaced by an alkylamino radical for example by treatment with the appropriate amines in an autoclave at temperatures of from 50° to 100° C., advantageously at 55° to 80° C., and under the autogenous pressure. It is advantageous to use an excess of the amine, for example liquid methylamine. Small amounts of solvent acids, such as formamide or dimethylformamide, may be added.

If the halogen atom in the 4-position of the 1-aminoanthraquinone-2-carboxylic acid amide is to be replaced by the alkylamino radical, the procedure may be for example as follows: the acid amide is treated with at least double the amount of the alkylamine in an inert solvent, such as dimethylformamide, dimethyl sulfoxide or advantageously in excess alkylamine and in the presence of copper salts or copper powder at temperatures of 60° to 100° C.

The new dyes are blue disperse dyes for dyeing and printing synthetic and semisynthetic textile material, such as polyester, polyamide and acetate material. They are particularly suitable for dyeing and printing cellulose acetate on which they give bright blue dyeings and prints having excellent wet fastness properties. Mixtures of the dyes may also be used with good results.

The invention is further illustrated by the following examples, in which parts are by weight.

EXAMPLE 1

936 parts of 1-amino-4-nitroanthraquinone-2-carboxylic acid chloride is suspended in 7500 parts of methanol with 150 parts of anhydrous sodium carbonate. 241 parts of butylamine (1-aminobutane) is added and the whole is stirred for six hours at 20° to 30° C. and then for four hours at 50° to 60° C. The residue is suction filtered, washed with methanol and dried. 1017 parts of the corresponding butylamide is obtained.

500 parts of the butylamide obtained is mixed with 140 parts of formamide and 1700 parts of liquid methylamine. The mixture is heated for three hours at 55° C. in an autoclave. After the pressure has been released, the reaction mixture is stirred with water. The residue is suction filtered, washed with cold and hot water until the liquid running away is colorless, and dried. The yield is 467 parts of 1 - amino-4-methylaminoanthraquinone-2-carboxylic acid butylamide having a melting point of 155° to 156° C. (after having been recrystallized from chlorobenzene).

EXAMPLE 2

25 parts of 1-amino-4-nitroanthraquinone-2-carboxylic acid chloride is introduced with cooling into 100 parts of liquid methylamide and 5 parts of dimethyl formamide. The mixture is heated for one hour at 60° C. in an autoclave. The product is worked up as described in Example 1 and 18 parts of 1-amino-4-methylaminoanthraquinone-2-carboxylic acid methylamide having a melting point of 201° to 202° C. (after having been recrystallized from chlorobenzene) is obtained.

EXAMPLE 3

30 parts of 1-amino-4-nitroanthraquinone-2-carboxylic acid chloride is stirred at room temperature in 180 parts of benzene with 20 parts of isopropylamine (2-aminopropane) for eight hours. The whole is then heated under reflux for thirty minutes, 30.5 parts of the corresponding isopropylamide is isolated. 25 parts of this compound is heated in 150 parts of liquid methylamine and 5 parts of dimethyl formamide for two hours at 65° C. The product is worked up as described in the foregoing examples. 20 parts of 1 - amino - 4 - methylaminoanthraquinone-2-carboxylic acid isopropylamide is obtained having a melting point of 196° to 197° C. (after it has been recrystallized from xylene).

EXAMPLE 4

30 parts of 1-amino-4-nitroanthraquinone-2-carboxylic acid chloride is stirred for eight hours at room temperature in 300 parts of xylene with 15 parts of isobutylamine (1-amino-2-methylpropane). The whole is then heated for an hour under reflux. The product is worked up as in the foregoing examples. 31.5 parts of the corresponding isobutylamide is obtained.

30 parts of this compound is heated in 150 parts of liquid methylamine and 6 parts of dimethyl formamide in an autoclave for two hours at 65° to 70° C. The product is worked up as described in the foregoing examples. 27.5 parts of 1 - amino - 4 - methylaminoanthraquinone-2-carboxylic acid isobutylamide is obtained having a melting point of 176° to 177° C. (after it has been recrystallized from chlorobenzene).

EXAMPLE 5

30 parts of the butylamide obtained by the method described in Example 4 from 1-amino-4-nitroanthraquinone-2-carboxylic acid chloride and 2-aminobutane is heated in an autoclave with 150 parts of liquid methylamine and 6 parts of dimethyl formamide for two hours at 65° to 70° C. The product is worked up as described in the foregoing examples. 27 parts of the corresponding 1 - amino-4-methylaminoanthraquinone-2-carboxylic acid butylamide is obtained having a melting point of 167° to 168° C. (after it has been recrystallized from chlorobenzene).

EXAMPLE 6

25 parts of 1-amino-4-nitroanthraquinone-2-carboxylic acid chloride is heated in an autoclave with 100 parts of liquid ethylamine and 10 parts of dimethyl formamide for three hours at 60° to 65° C. The product is worked up as described in the foregoing examples. 21 parts of 1-amino-4-ethylaminoanthraquinone-2-carboxylic acid ethylamide is obtained having a melting point of 191° to 193° C. (after having been recrystallized from butanol).

EXAMPLE 7

25 parts of 1-amino-4-nitroanthranquinone-2-carboxylic acid isomylamide (which has been obtained by a method analogous to that described in Example 4 by using isoamylamide (1-amino-3-methylbutane)) is heated with 100 parts of liquid methylamine and 10 parts of dimethylformamide in an autoclave for three hours at 60° to 65° C. The product is worked up as described in the foregoing examples. 22 parts of 1-amino - 4 - methylamino-2-carboxylic acid isoamylamide is obtained having a melting point of 156° to 157° C. (after having been recrystallized from benzene).

EXAMPLE 8

10 parts of 1-amino-4-bromoanthraquinone-2-carboxylic acid butylamide is heated in 75 parts of liquid methylamine in the presence of 0.5 part of basic copper acetate for three hours in an autoclave at 80° C. Gaseous excess amine is then removed and the reaction product is stirred with water. The residue is suction filtered, washed until the washing liquid running away is colorless, and dried. 7 parts of the dye described in Example 1 is obtained.

I claim:

1. Any anthraquinone dye having the general formula:

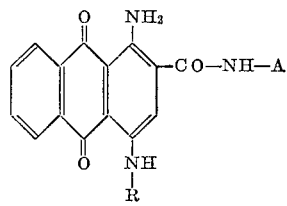

in which R denotes an alkyl radical having one to three carbon atoms and A denotes a linear or branched alkyl radical having three to five carbon atoms.

2. The dye having the formula:

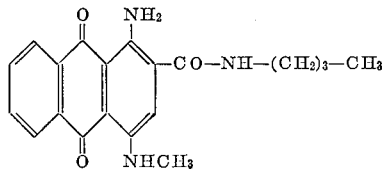

3. The dye having the formula:

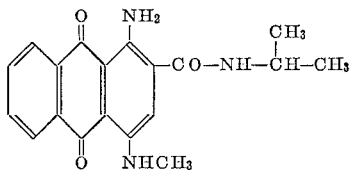

4. The dye having the formula:
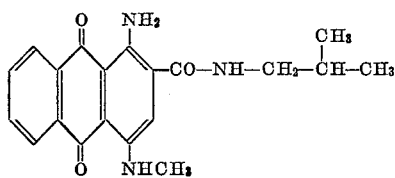
References Cited
UNITED STATES PATENTS
1,871,821 8/1932 Nawiasky et al. _____ 260—377
1,894,191 1/1933 Nawiasky et al. _____ 260—377
JAMES A. PATTEN, Primary Examiner
E. J. SKELLY, Assistant Examiner
U.S. Cl. X.R
8—40